(12) United States Patent
Johnson et al.

(10) Patent No.: US 10,947,062 B2
(45) Date of Patent: Mar. 16, 2021

(54) PRODUCT-STACKING AND CASE-PACKING SYSTEM AND METHOD

(71) Applicant: R.A. Pearson Company, Spokane, WA (US)

(72) Inventors: Michael James Johnson, Spokane, WA (US); David John Nelson, Spokane, WA (US); Steven Joseph Allard, Spokane, WA (US)

(73) Assignee: Pearson Packaging Systems, Spokane, WA (US)

( * ) Notice: Subject to any disclaimer, the term of this patent is extended or adjusted under 35 U.S.C. 154(b) by 0 days.

(21) Appl. No.: 16/118,156

(22) Filed: Aug. 30, 2018

(65) Prior Publication Data
US 2019/0062074 A1   Feb. 28, 2019

Related U.S. Application Data

(60) Provisional application No. 62/552,015, filed on Aug. 30, 2017.

(51) Int. Cl.
| | |
|---|---|
| *B65G 47/90* | (2006.01) |
| *B65G 57/03* | (2006.01) |
| *B65G 57/00* | (2006.01) |
| *B65G 47/256* | (2006.01) |
| *B65G 47/91* | (2006.01) |
| *B25J 9/00* | (2006.01) |

(Continued)

(52) U.S. Cl.
CPC .......... *B65G 47/907* (2013.01); *B25J 9/0051* (2013.01); *B65B 5/105* (2013.01); *B65B 35/44* (2013.01); *B65G 47/256* (2013.01); *B65G 47/917* (2013.01); *B65G 57/005* (2013.01); *B65G 57/035* (2013.01); *B25J 9/0093* (2013.01); *B65G 47/244* (2013.01); *B65G 47/914* (2013.01)

(58) Field of Classification Search
CPC .... B65G 37/005; B65G 47/907; B25J 9/0084; B25J 15/0052; B65B 5/08; B65B 5/105
See application file for complete search history.

(56) References Cited

U.S. PATENT DOCUMENTS

| | | | | |
|---|---|---|---|---|
| 3,548,995 A | * | 12/1970 | Wiseman | B65H 33/16 414/790.4 |
| 3,591,018 A | * | 7/1971 | Nalbach | B65H 3/00 414/788.8 |

(Continued)

*Primary Examiner* — Gregory W Adams
(74) *Attorney, Agent, or Firm* — Lee & Hayes, P.C.

(57) ABSTRACT

Techniques for product-stacking and case-packing are particularly adapted for product that is packaged in envelopes or flexibly-sided containers. Such products include may different types, such as foodstuffs, books, boxed goods, etc. In an example, a product-stacking and case-packing system may include a product-stacking assembly and a case-packing assembly. In the example, the product-stacking assembly may be configured with a plurality of pairs of flights, each pair of flights programmed to move according to operation of an associated pair servo motors, and programmed to receive and down-stack incoming product items into groups. In the example, the case-packing assembly may include a robotic arm and end-of-arm tool configured to grasp one or more groups of stacked product items, when pushed from the product-stacking assembly, and place each group of stacked product items in a case (e.g., a cardboard box).

13 Claims, 14 Drawing Sheets

(51) Int. Cl.
*B65B 5/10* (2006.01)
*B65B 35/44* (2006.01)
*B65G 47/244* (2006.01)

(56) References Cited

U.S. PATENT DOCUMENTS

| | | | | |
|---|---|---|---|---|
| 3,643,816 A * | 2/1972 | Jacobsen | ............ | B65G 37/005 414/788.9 |
| 3,698,542 A * | 10/1972 | Reger | ............ | B65G 25/10 198/468.8 |
| 4,460,169 A * | 7/1984 | Bartesaghi | ............ | B65H 29/40 271/192 |
| 4,538,511 A * | 9/1985 | Wise | ............ | B65B 27/08 100/26 |
| 4,686,813 A * | 8/1987 | Sawada | ............ | B65B 5/06 53/143 |
| 4,902,184 A * | 2/1990 | Fritz | ............ | B65G 57/14 414/790.3 |
| 4,977,827 A * | 12/1990 | Chandhoke | ............ | B65B 27/08 100/14 |
| 5,484,050 A * | 1/1996 | Cheatham | ............ | B65G 57/00 198/427 |
| 5,655,871 A * | 8/1997 | Ishii | ............ | H01L 21/67781 414/416.02 |
| 5,860,784 A * | 1/1999 | Schuitema | ............ | B65G 1/0407 414/280 |
| 5,878,999 A * | 3/1999 | Neri | ............ | B65H 31/10 270/58.08 |
| 5,931,634 A * | 8/1999 | Neri | ............ | B65H 31/32 271/217 |
| 6,241,458 B1 * | 6/2001 | Berndl | ............ | B65G 57/11 414/790.3 |
| 7,096,650 B2 * | 8/2006 | Van Dam | ............ | B65B 5/061 53/201 |
| 7,278,532 B2 * | 10/2007 | Martin | ............ | B65G 1/127 198/799 |
| 7,856,797 B2 * | 12/2010 | Black | ............ | B65B 5/061 53/147 |
| 8,191,702 B2 * | 6/2012 | Itoh | ............ | B65G 37/005 198/468.8 |
| 8,356,967 B2 * | 1/2013 | Gammerler | ............ | B65H 31/18 414/790.8 |
| 8,770,911 B2 * | 7/2014 | Webb | ............ | B65B 23/14 198/725 |
| 8,777,552 B2 * | 7/2014 | Ward | ............ | B25J 15/0052 414/623 |
| 9,199,791 B2 * | 12/2015 | Pietsch | ............ | B65G 47/5127 |
| 9,221,628 B2 * | 12/2015 | Dax | ............ | B65G 57/00 |
| 9,394,124 B2 * | 7/2016 | Tsuji | ............ | B65H 1/027 |
| 2016/0318720 A1 * | 11/2016 | Roos | ............ | B65G 57/11 |

* cited by examiner

Detail "A" reference view Fig.3, Fig.4, Fig.5, Fig.6 and Fig.7

PRODUCT-STACKING AND CASE-PACKING SYSTEM AND METHOD

RELATED APPLICATIONS

This patent application claims priority to, and is related to, U.S. patent application Ser. No. 62/552,015, titled "Product stacking and Case packing System and Method", filed on 30 Aug. 2017, commonly assigned herewith, and hereby incorporated by reference.

BACKGROUND

Products packaged in envelopes or flexibly-sided packaging may be streamed down a conveyor belt during a manufacturing process. In one example among thousands, the packages may contain a food product, such as powdered gravy mix. Known packaging techniques have not satisfied complex design requirement specifications to group and package such items.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes techniques for product-stacking and case-packing, particularly for product that is packaged in envelopes or flexibly-sided containers. Such products may include different types, such as foodstuffs, books, packaged goods, etc. Examples of foodstuffs include powdered sauce mixes, powdered drink mixes, pet food and treats, and others.

An example illustrating some of the techniques discussed herein—not to be considered a full or comprehensive discussion—may assist the reader. In the example, a product-stacking and case-packing system may include a product-stacking assembly and a case-packing assembly. In the example, product obtained from a conveyor or other source is stacked, and the stacked product is packed (e.g., by a robotic arm) in a case. In the example, the product-stacking assembly may be configured with a plurality of pairs of flights, each pair of flights programmed to move according to operation of an associated pair of servo motors, and programmed to receive and down-stack incoming product. In the example, the case-packing assembly may include a robotic arm and end-of-arm tool configured to grasp one or more groups of packages from the product-stacking assembly and place each group in a case (e.g., a cardboard box).

In the example, the product-stacking assembly receives product from an infeed conveyor. A pair of flights receive a product package, and are configured to incrementally down-stack after each received package. Down-stacking lowers the pair of flights by a width, height or thickness of a product item, allowing the next product item to be located on top of the previous item. In an example, a product item flies off the end of a conveyor belt, hits a stop, and comes to rest on top of the flight pair or an earlier-sent package. The stack of packages is down-stacked, making room for the next package item, which also flies off the end of the conveyor and stops on top of the previous package. After a set number of packages are received and grouped, e.g., a dozen packages, the down-stacking flights move the group from the path of incoming packages. A second pair of flights is then positioned to perform a down-stacking process in which a second group of packages is received. Periodically, one or more groups of packages are removed from the product-stacking assembly by the case-packing assembly. The case-packing assembly places the removed product group(s) or stack(s) into empty cases. One or more stacks of items may be placed in each case. Each case, once filled, may be transported by an outflow conveyor. The down-stacking operation, and the stack-removal and case-packing operation, may be performed simultaneously on different product items.

Other variations of the systems, devices, techniques and methods are discussed in the sections below.

Example System and Techniques

Figure 1:
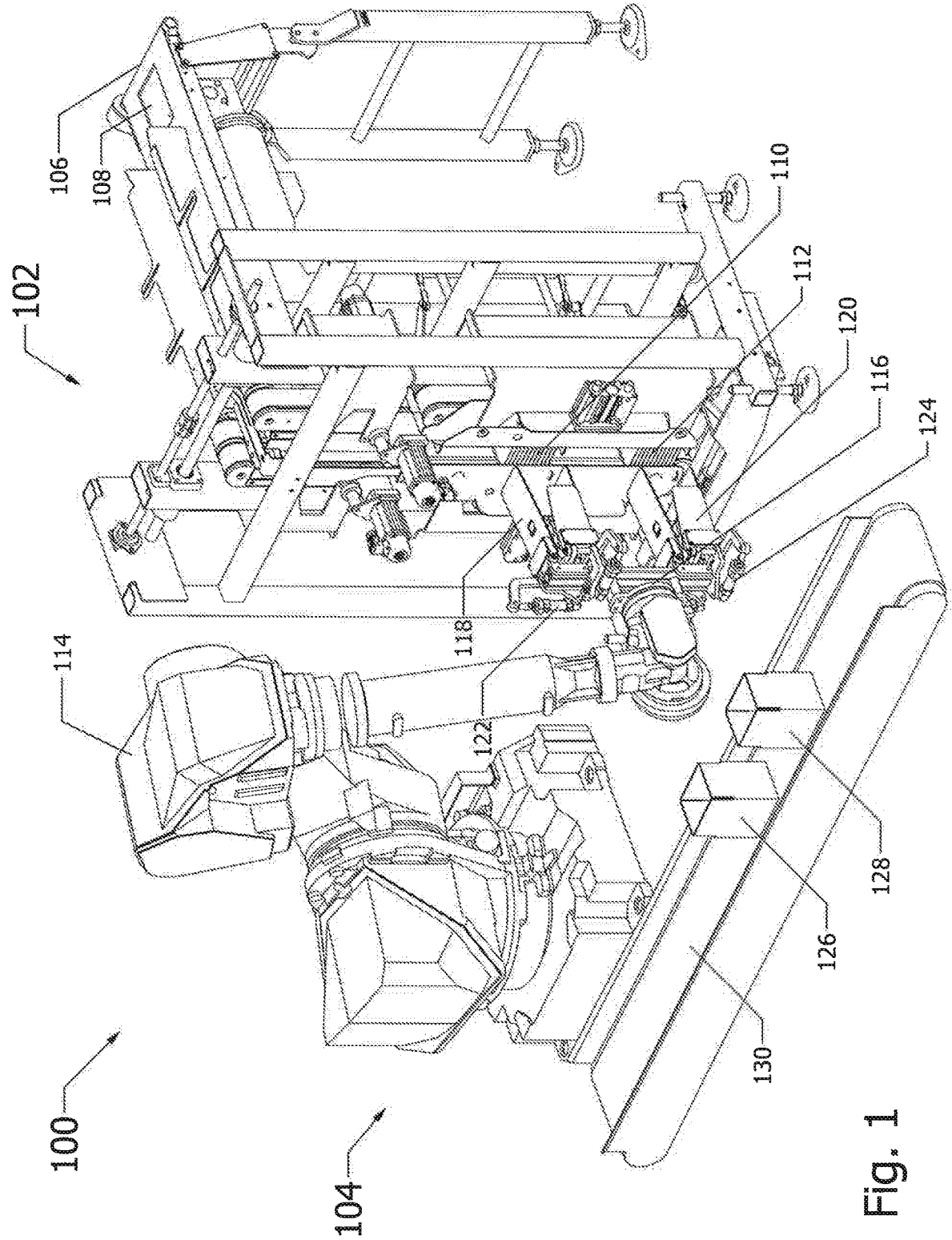
FIG. 1 is perspective view of a product-stacking and case-packing system.

FIG. 1 shows a product-stacking and case-packing system 100. A product-stacking assembly 102 is configured to receive product on an infeed conveyor and to stack that product. A case-packing assembly 104 is configured to receive stacked product from the product-stacking assembly 102 and to pack cases with the stacked product.

The product-stacking assembly 102 includes an incoming conveyor 106 that transports incoming product items 108. In the example shown, the incoming product items are individually positioned on the conveyor 106. Operation of the product-stacking assembly 102 reorganizes the incoming product items 108 into groups of stacked product items. In the example shown, two groups of stacked product items 110, 112 are produced for each action of the robotic arm. In other examples, different numbers of groups could be produced, depending on the design requirements of a particular installation.

The case-packing assembly 104 may include a robotic arm 114 and an end-of-arm tool 116. In the example shown, the end-of-arm tool 116 includes two product-stack receiving grippers 118, 120. Each gripper may have top and bottom flaps that are operated by compressed-air-powered cylinders 122, 124 or alternative power systems. By operation of the air cylinders, the upper/lower and left/right pairs of flaps of each gripper may be opened and closed. By programming the end-of-arm tool 116, the compressed air may be controlled (e.g., by solenoid valves) to operate each gripper to grasp groups of stacked product items. In the example shown, two groups of stacked product items may be grasped by the two grippers of the end-of-arm tool 116. The each of the two groups may be inserted into a case 126, 128 moving on the out-going conveyor 130.

Figure 2:
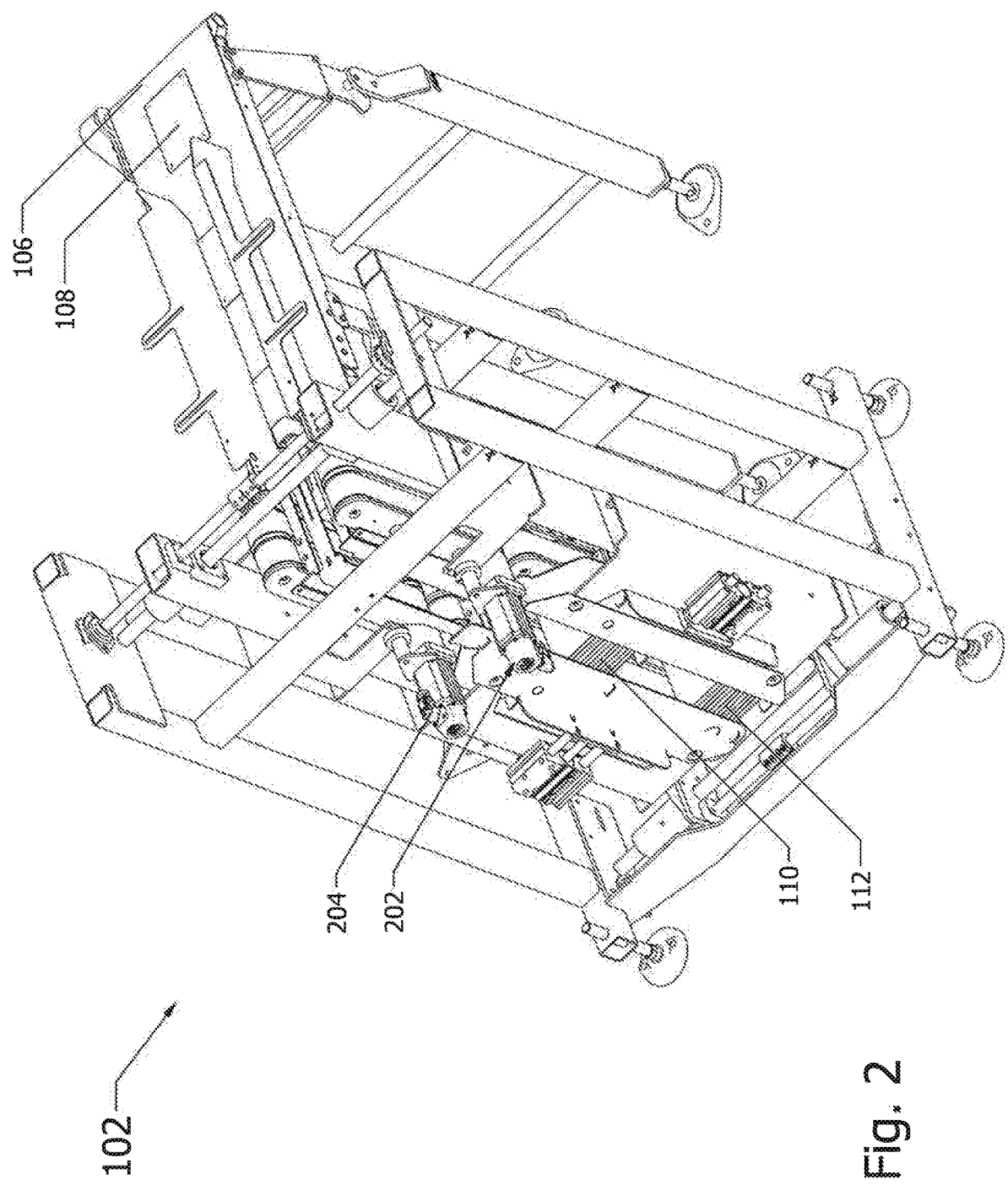
FIG. 2 is a perspective view of a product-stacking assembly.

FIG. 2 shows a product-stacking assembly 102 having an incoming conveyor 106 and product item(s) 108. After leaving the conveyor, the product items are accumulated into groups of product items 110, 112, in part by operation of an upper flight assembly and a lower flight assembly of the product-stacking assembly. The upper flight assembly provides a pair of flights that are currently receiving and down-stacking incoming product items. The upper flight assembly may also provide one or more other pairs of flights that are "on deck," i.e., first and subsequent in line to move into position to receive product as the currently down-stacking pair of flights receives a full load of product items. Servo motors 202, 204 are representative of servo motors operating the flights of the upper flight assembly. In an example, the upper flight assembly may have two pair of flights (e.g., one receiving product and one that is "on deck" to receive product when required to do so). Each flight in each pair may be moved by a belt, which is driven by a servo motor. Accordingly, four servo motors may be used in the upper flight assembly.

In the example, the lower flight assembly may have three pairs of flights, each flight within each pair being driven by a belt and an associated servo motor. Accordingly, six belts and six servo motors may be used. The lower flight assembly may contain one or more pair of flights (e.g., two pair of flights are seen in FIG. 2) that support a group of stacked of items waiting to be removed. The lower flight assembly may also contain one or more pairs of flights that are ready to receive a stack of product items from a pair of flights of the upper flight assembly. However, alternative numbers of paired flights in each of the upper and lower flight assemblies could be substituted.

Thus, in an example, the upper flight assembly contains one pair of flights actively receiving and down-stacking product, as well as one or more other pairs of flights ready to move into position to receive and down-stack product. In the example, the lower flight assembly may contain one or more pairs of flights to support groups or stacks of product items waiting to be removed by a robot arm, as well as one or more pairs of flights in position(s) ready to receive, or move to receive, groups of items from a pair of flights in the upper flight assembly.

Flights are described herein as configured in a paired relationship of left and right flights, each supporting a respective left and right side of a product item. Alternatively, a single flight may be used to support a stack of product items. Such a single flight may be configured as a flap upon which product items are stacked. Such a flap may pivot as a trapdoor to allow product to fall and transfer from the upper flight assembly to the lower flight assembly. Accordingly, the designs, methods of operation, and techniques described herein can easily be adapted from use with paired flights to use with single flights.

Figure 3:
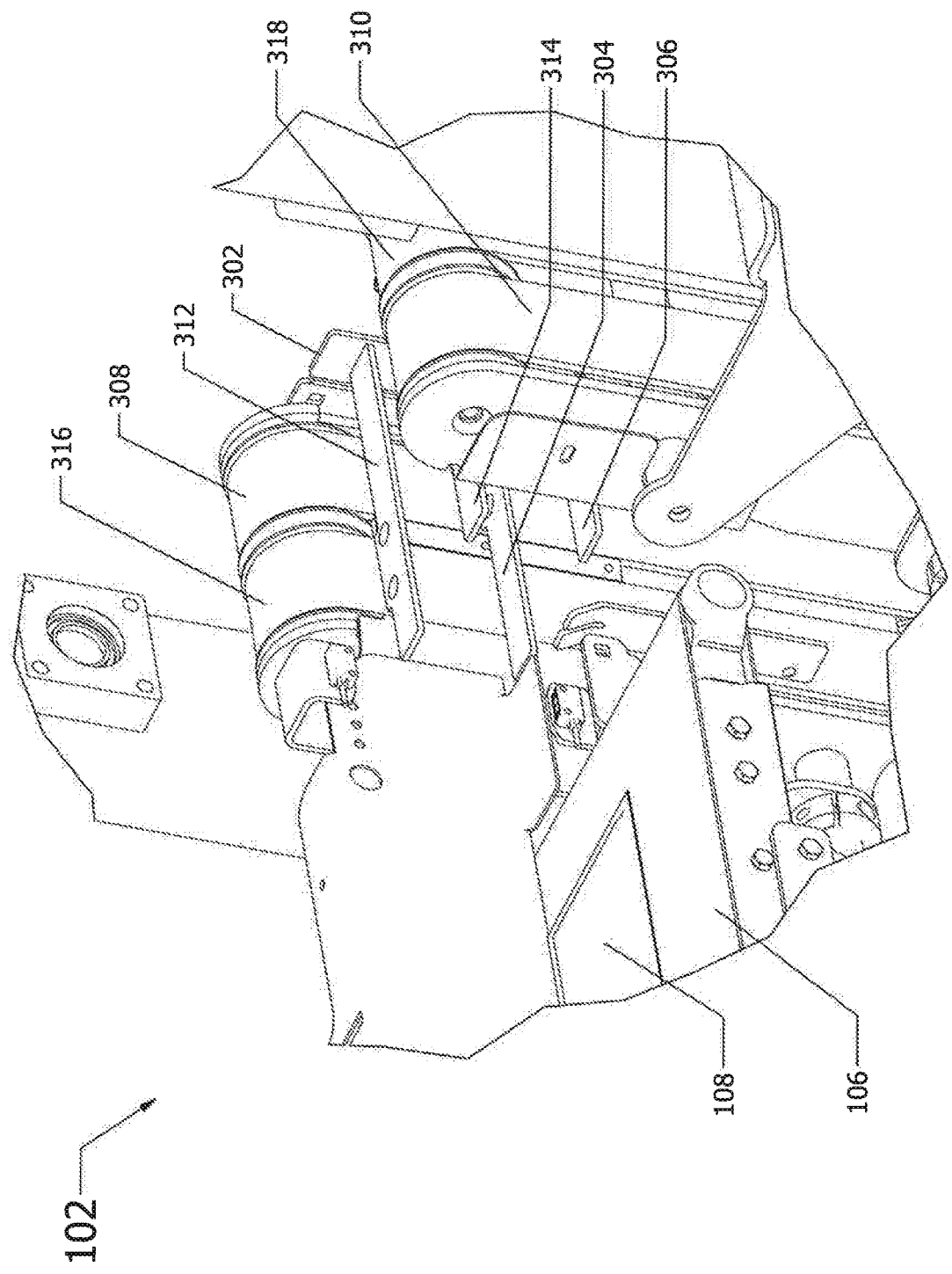
FIG. 3 is a perspective view of an upper flight assembly of the product-stacking assembly, with a pair of flights in position to receive a first product item.

FIG. 3 shows an upper flight assembly of the product-stacking assembly 102. A flight pair is in position to receive a first product item. Accordingly, in the view shown, the flight pair does not yet support a first product item. After the first product item is received, the flight pair will down-stack, and subsequent product items will be received until a predetermined number have been received, and a second flight pair will move into position to receive another group of product items.

In the example shown, product items 108 are moved by incoming conveyor 106. A product item 108 (shown in the inset) is about to exit the conveyor 106, after which it will strike the backstop 302 and land on a pair of flights 304, 306. Flight 304 is driven by drive belt 308 and flight 306 is driven by drive belt 310. In the example shown, the flight pair 304, 306 will perform a down-stacking function, such that the flight pair will be lowered by belts 308, 310 after each product item lands on top of the previous product item (or lands on top of the flight pair, in the example of the first product item). When a group of stacked product items reaches a predetermined number (e.g., 6, 10, 12, etc.) the flight pair 304, 306 move downwardly, to deliver the group of stacked items to the lower flight assembly. After delivery of the group of stacked items, the flight pair 304, 306 will continue to move until they are located where flight pair 312, 314 are located in the view of FIG. 3.

When the stacked product on flight pair 304, 306 reaches the predetermined number and that flight pair moves downwardly, the flight pair 312, 314, driven by belts 316, 318, respectively, move into the position of flight pair 304, 306 in the view shown. In that position, they are properly located to "catch" the next product item that "shoots" off the end of the conveyor 106 and hits the backstop 302. The flight pair 312, 314 will then perform a down-stacking function, moving to progressively lower levels as each product item shoots off the end of the conveyor.

Figure 4:
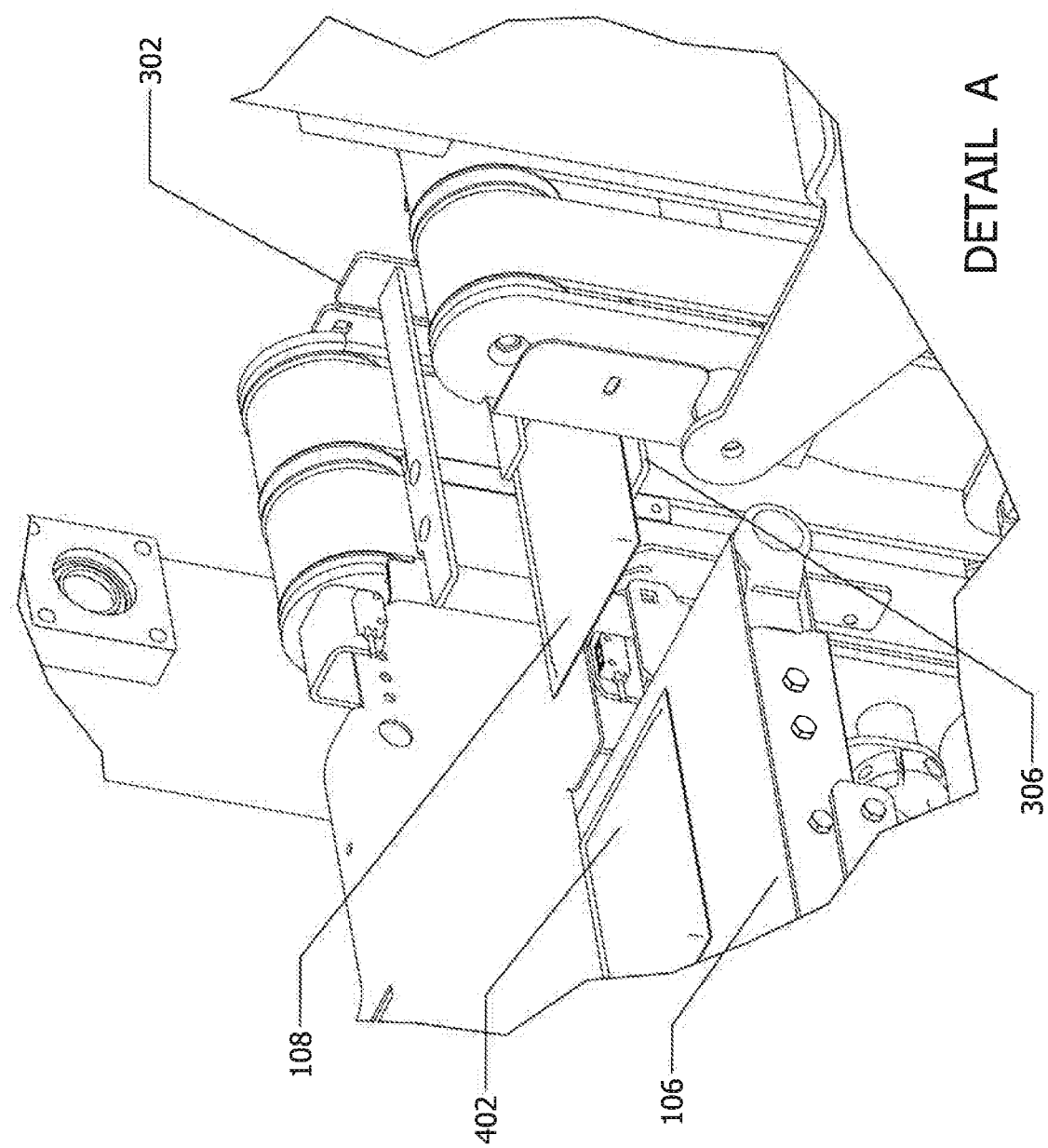
FIG. 4 is a perspective view of the upper flight assembly, with a first product item in position on the pair of flights.

FIG. 4 shows the upper flight assembly with a first product item in position on the upper flight assembly. Accordingly, a down-stacking motion or process has started. The down-stacking motion may include incrementally lowering a pair of flights with a series of discrete and/or separate downward motions, each motion associated with a received product item. Accordingly, in each of a series of downward motions by the pair of flights, space is vacated to allow each of a series of respective items to assume positions, each item temporarily located at the top of the stack of items supported by the pair of flights. The product item 108 is the first product item of a group that will form, supported by the flight pair 304 (flight 304 is obscured by the product item 108) and 306. The product item 402, which is still on the conveyor in the view shown, will "shoot" off the end of the conveyor, strike the backstop 302, and come to rest on top of product item 108. This is possible in part because the product item 108 was "down-stacked" to make room for the item 402.

Figure 5:
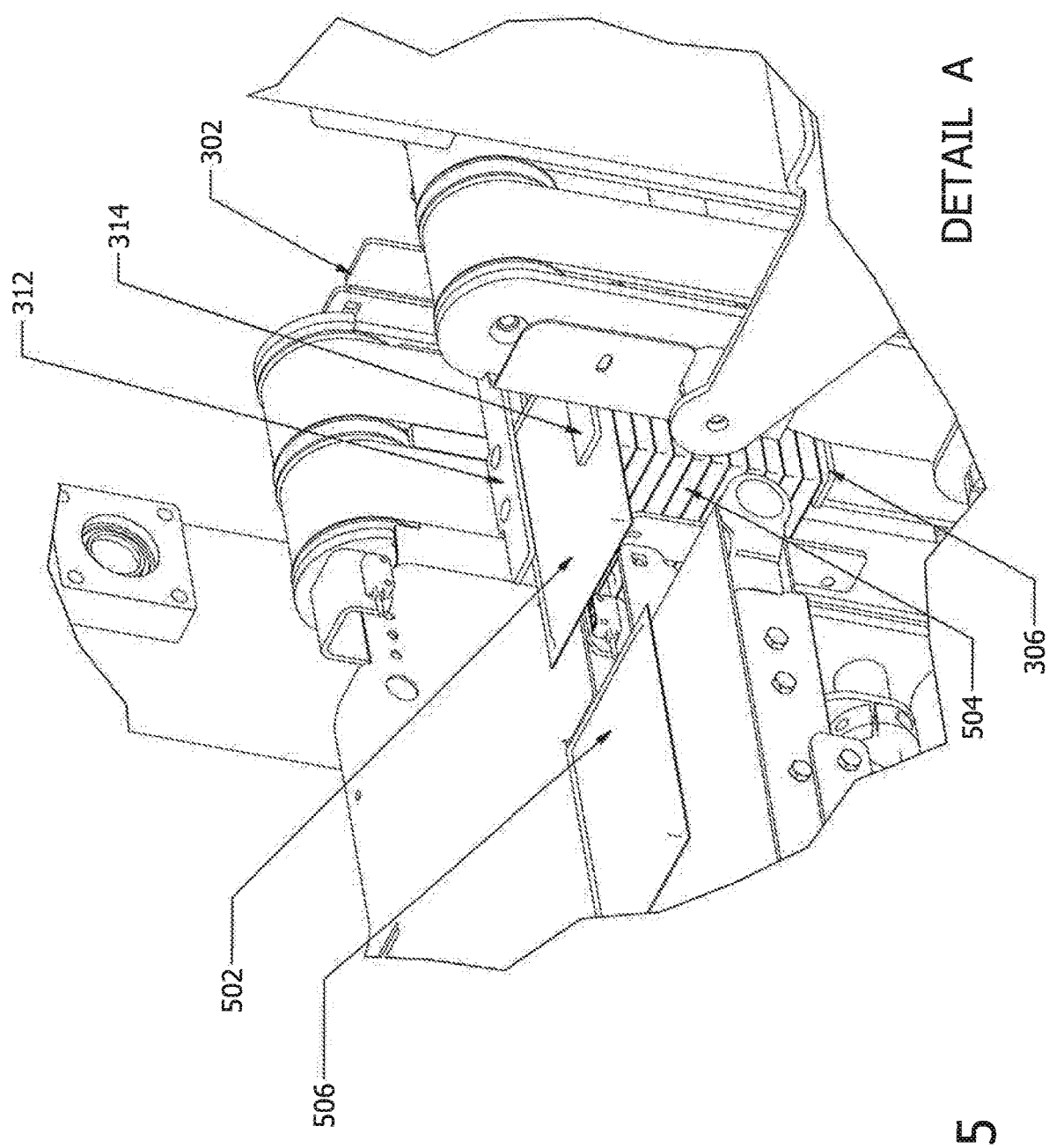
FIG. 5 is a perspective view of the upper flight assembly, with a last product item in a group of product items arriving stacked, and with a second pair of flights in position to receive additional product items.

FIG. 5 shows the upper flight assembly at a point wherein the final product item 502 to join a group 504 of product items, has just left the conveyor, and is moving into position on the top of the stacked group. The group 504 is supported by flight pair 304 (obscured in the view) and 306. The next product item 506 will exit the conveyor belt and land on the top of the flight pair 312, 314, after they have moved slightly downwardly, from their current positions. Thus, product item 506 will be the first product item in a new group of product items.

Figure 6:
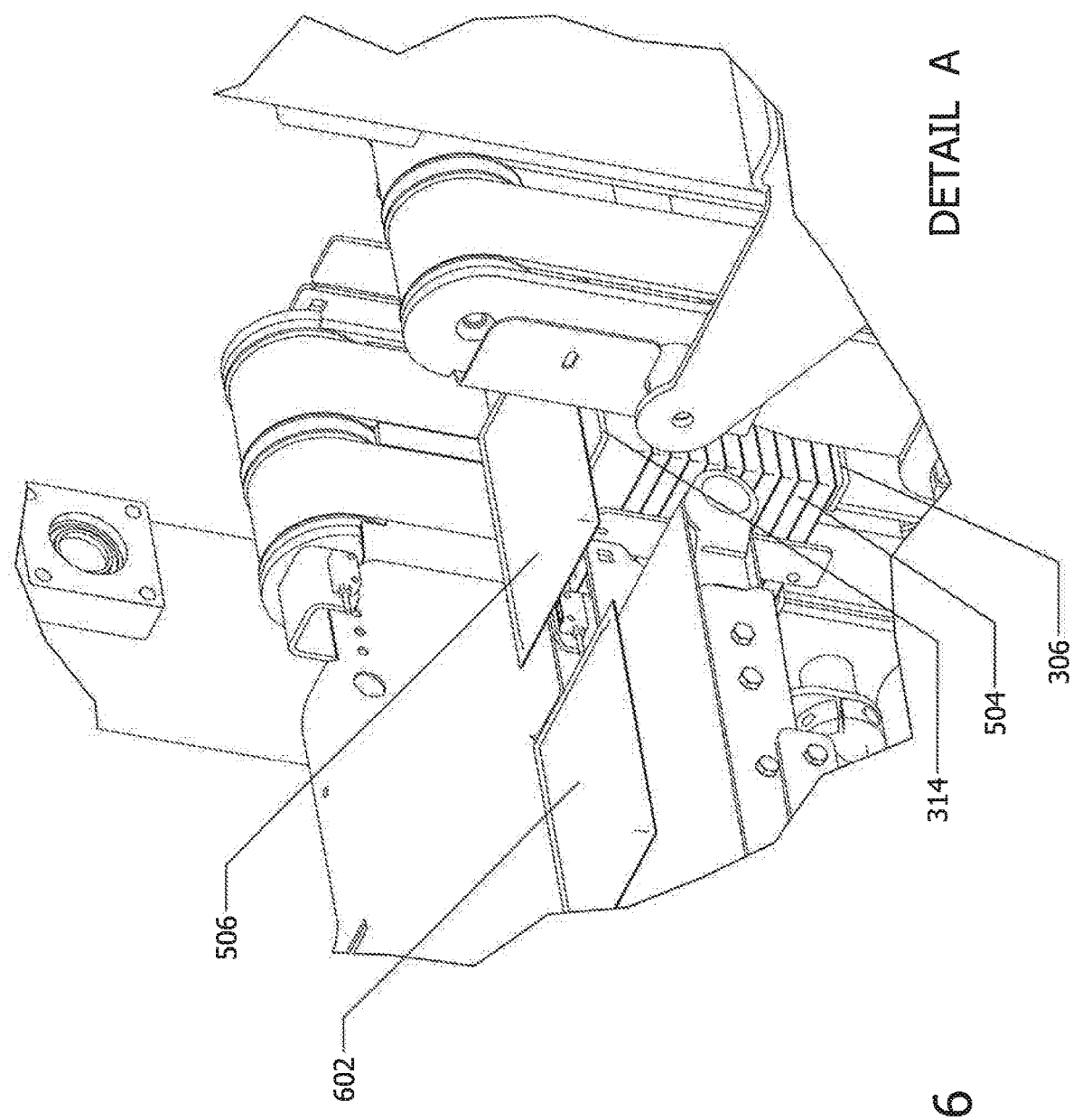
FIG. 6 is a perspective view of the upper flight assembly, with a first product item in position on the second pair of flights.

FIG. 6 shows the upper flight assembly with a first product item 506 moving into position on the second pair of flights within the upper flight assembly. The group of product items 504 is being lowered by flight pair 304 (obscured by the group 506) and 306. Product item 506 has landed on the top of flight pair 312 (obscured by product item 506) and 314. As a part of the down-stacking process, the product item 506 will be lowered by the flight pair 312, 314, and the next product item 602 will land on top of product item 506.

Figure 7:
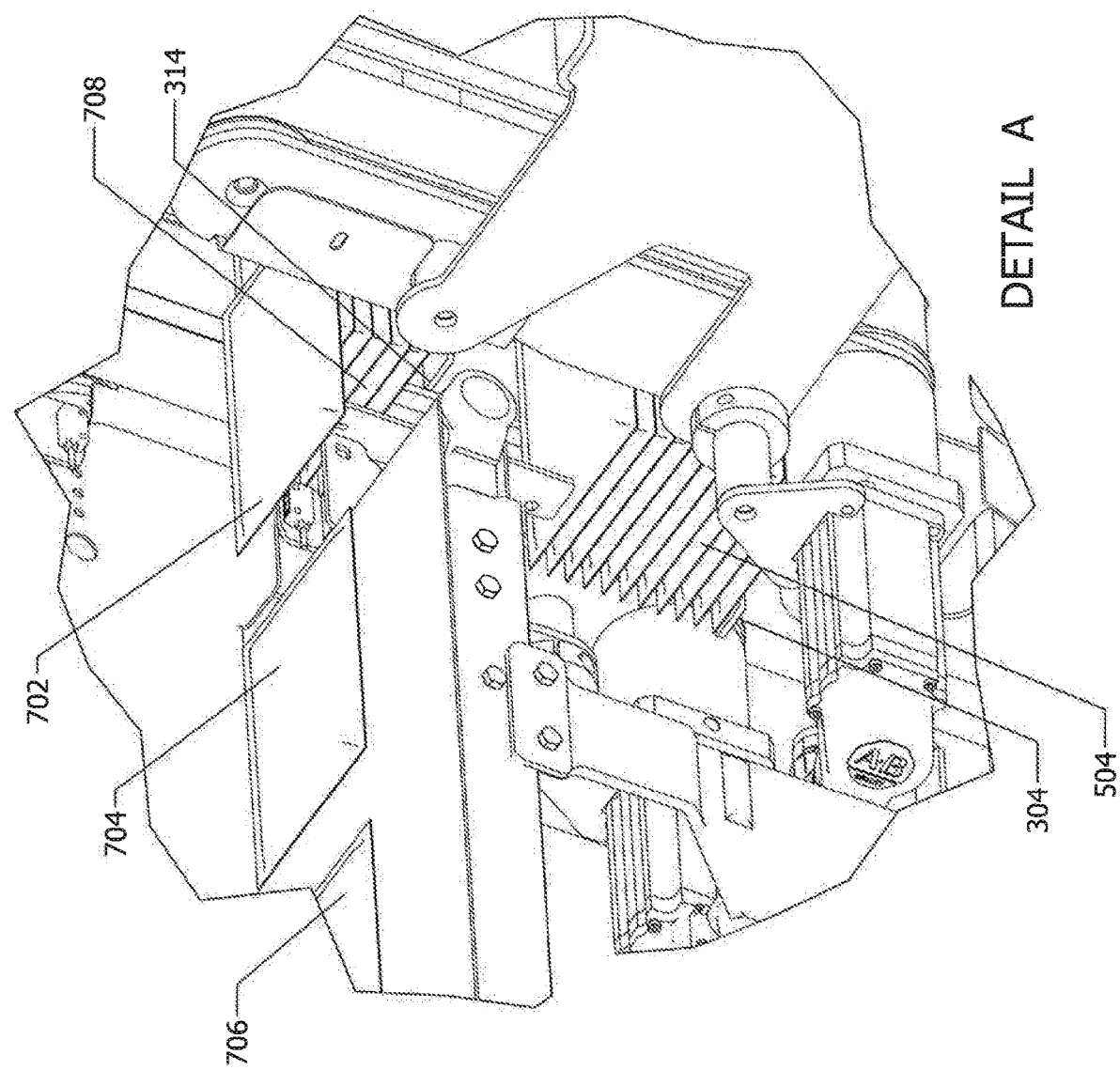
FIG. 7 is a perspective view of the upper flight assembly, with additional product items in position on the second pair of flights.

FIG. 7 shows the continuation of the down-stacking process of flight pair 312 (obscured) and 314. Product items 702, 704, 706 are moving to join a growing stack 708 of product items. The stack 504 of product items is moving downwardly, in response to movement of flight pair 304 and 306 (obscured).

Figure 8:
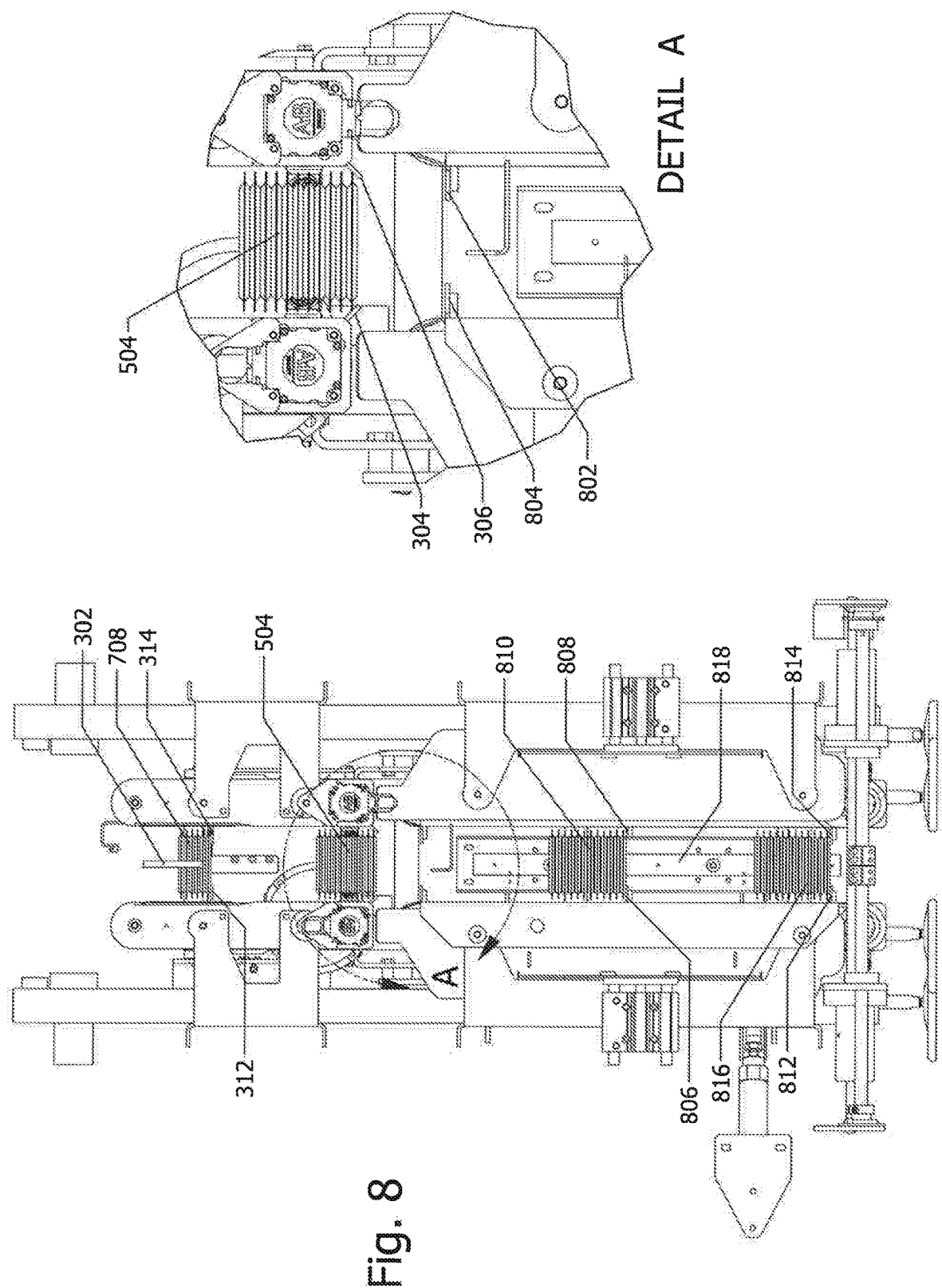
FIG. 8 is an orthographic view of the upper and lower flight assemblies, with a first group of product items ready to be lowered from the upper flight assembly to the lower flight assembly.

FIG. 8 shows the upper and lower flight assemblies with a group of stacked product items supported by the upper flight assembly that is in position to be transferred to the lower flight assembly. A down-stacking process including flight pair 312, 314 is accumulating a group 708 of stacked product items. The backstop 302 is shown, and functions to stop incoming product items after they leave the incoming conveyor. An earlier-formed group 504 of stacked product items is supported by flight pair 304, 306. This group will fall onto flight pair 802, 804 of the lower flight assembly, as the flight pair 306, 308 rotate about a roller in response to movement of their drive belt and no longer support the group 504. Flight pairs 806, 808 support a group 810 of stacked product items; similarly, flight pairs 812, 814 support an earlier-formed group 816 of stacked product items. The pusher or push bar 818 is in position to push the groups 810, 816 of stacked product items into the end-of-arm tool, which will grasp and move both groups of stacked product items for transfer to the case. In an alternative, the pusher 818 may push one or more groups of stacked product directly into a case, such as by use of side-loading techniques, wherein the open end of the case is pointed horizontally.

The inset of FIG. 8 shows the flight pair 304, 306 beginning to rotate as they follow the closed path of their respective drive belts. Rotation of the flight pair 304, 306 moves them out of contact with the group 504 of stacked product items. Accordingly, the group 504 will fall onto flight pair 802, 804 of the lower flight assembly.

Figure 9:
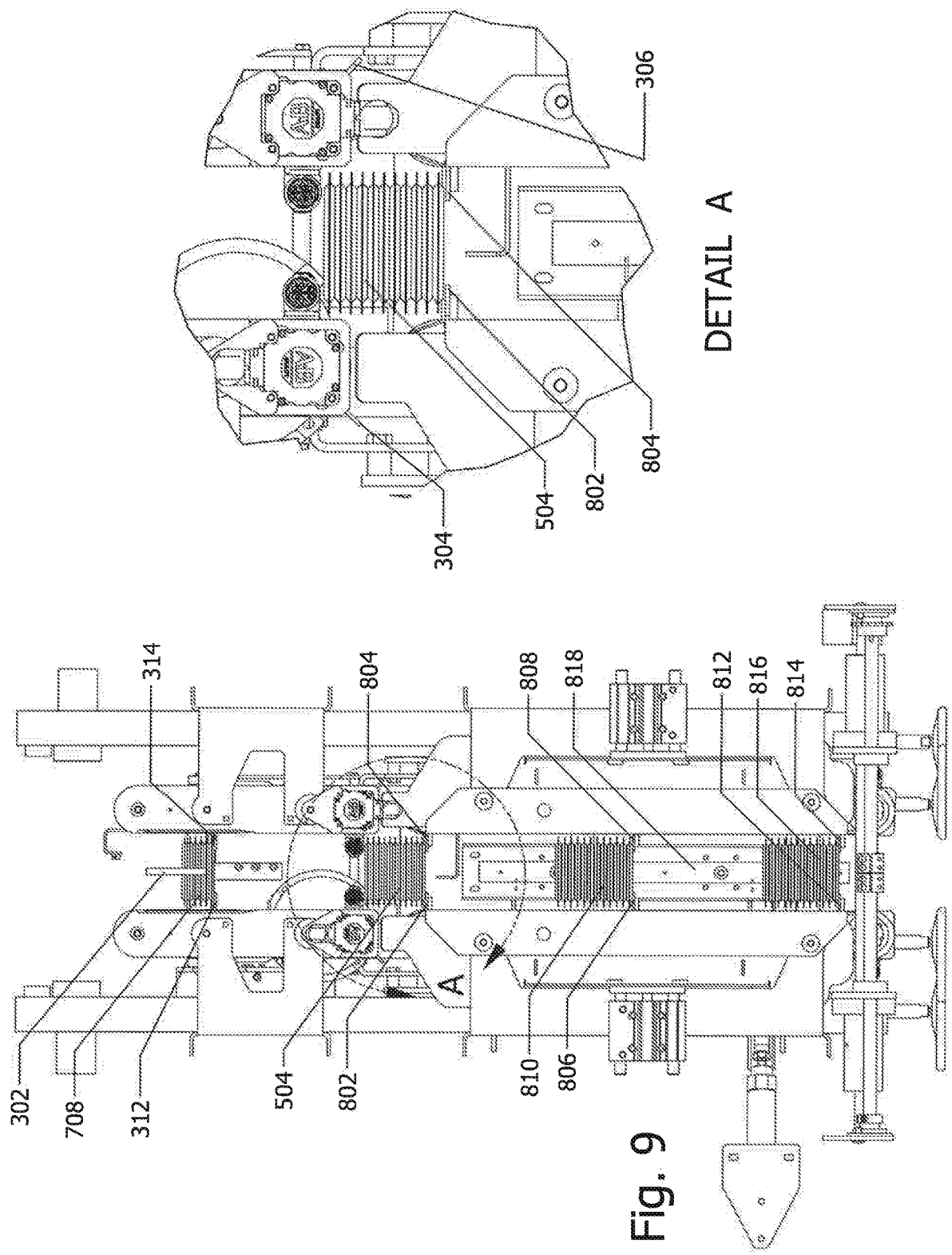
FIG. 9 is an orthographic view of the upper and lower flight assemblies, showing the completed transfer of stacked product from the upper flight assembly to the lower flight assembly.

FIG. 9 shows the result of the transfer of the group 504 of stacked product from the upper flight assembly to the lower flight assembly. The group 504 has been handed off by pair of flights 304, 306 (best seen in the enlarged inset view of FIG. 9) of the upper flight assembly, to the pair of flights 802, 804 of the lower flight assembly. The group 504 of stacked product items will be repositioned to the current location of group 810 in FIG. 9, after groups 810 and 816 are removed by the robotic arm and end-of-arm tool.

Figure 10:
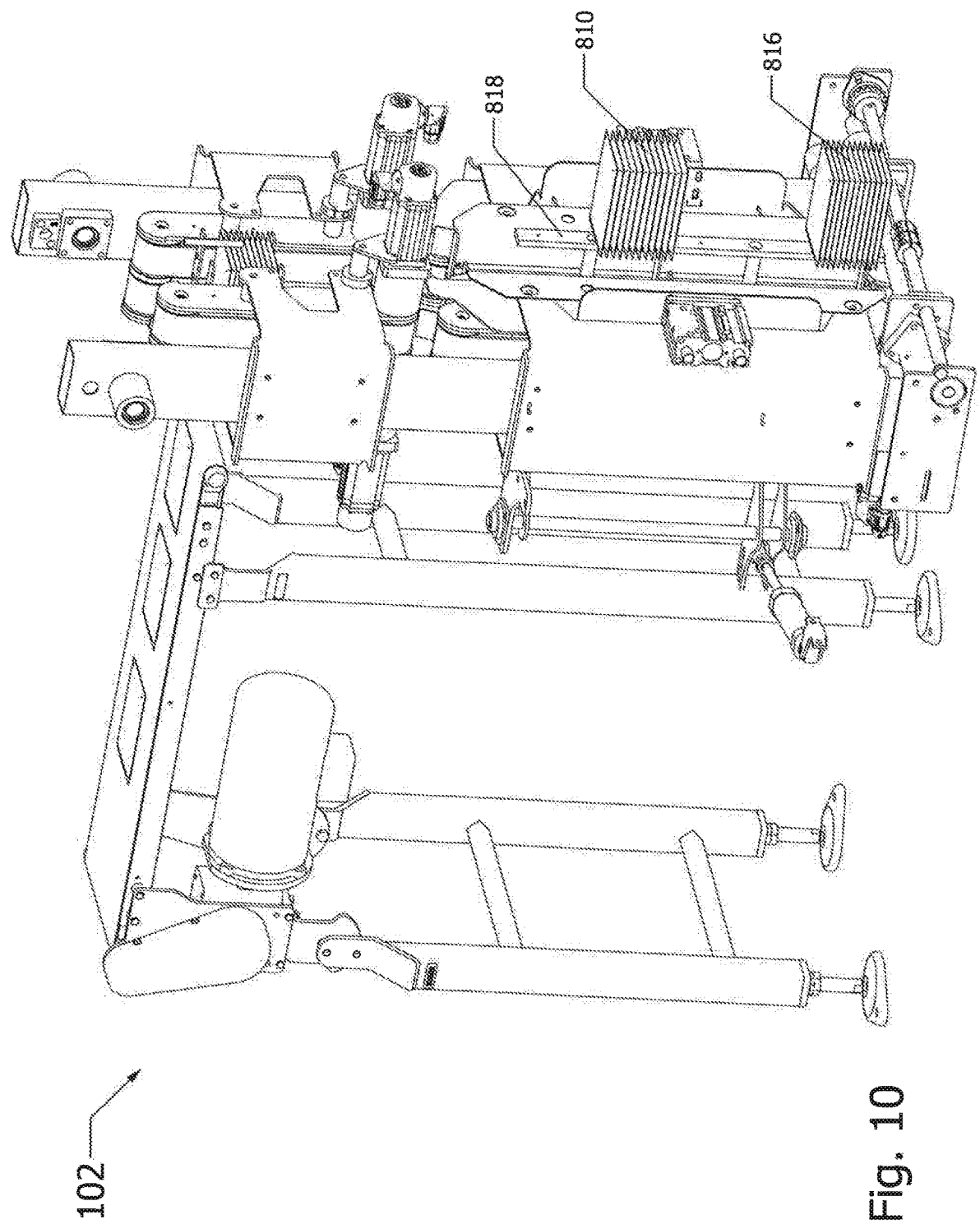
FIG. 10 is a perspective view of the product-stacking assembly showing a pusher moving two groups of stacked product items into an end-of-arm tool of a robotic arm (not shown, to allow view of the two groups), which will grasp the two groups.

FIG. 10 shows the product-stacking assembly 102 in a configuration wherein the pusher 818 has moved two groups 810, 816 of stacked product items into a position at which they are loaded into, and contained within, the end-of-arm tool of a robotic arm, or loaded directly into a case. The end-of-arm tool is not shown, so that the two groups of stacked product can be seen. That is, the groups of stacked product items, once pushed from the lower flight operational zone (i.e., the area or zone of operation of the lower flight assembly) by the pusher bar, would move to a position within the end-of-arm tool. In an alternative design, the two (or different number) groups of stacked product items, once pushed from the lower flight operational zone of the lower flight assembly by the pusher bar, would move to a position within two respective cases (not shown) having their open ends oriented horizontally. Accordingly, the cases could each be side-loaded with a group of stacked product items.

Figure 11:
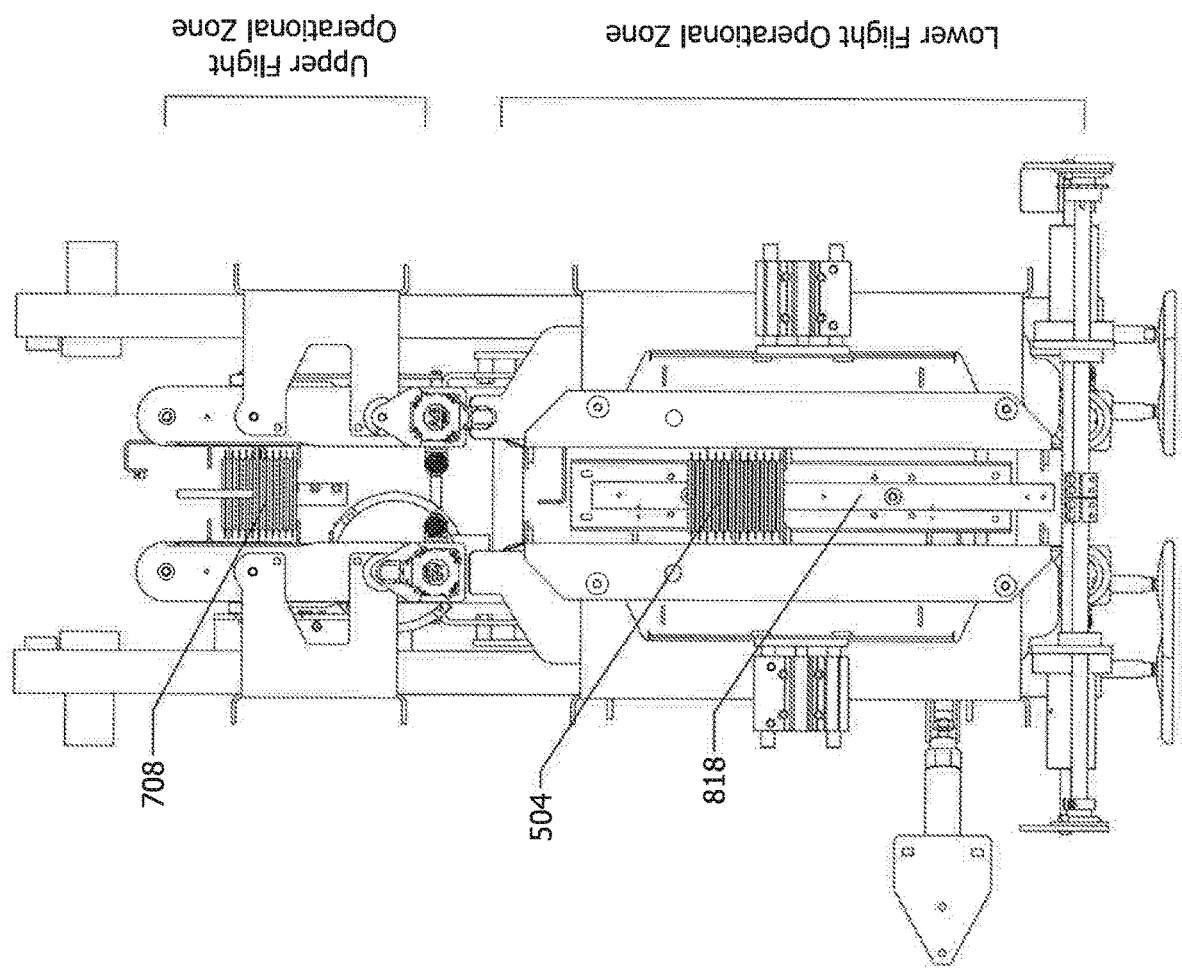
FIG. 11 is an orthographic view of the upper and lower flight assemblies, showing a group of stacked product items that was moved into the lower flight assembly after removal of two groups of stacked product items.

FIG. 11 shows the upper and lower flight assemblies, operating within the upper flight operational zone and the lower flight operational zone, respectively. FIG. 11 also shows movement of a group 504 of stacked product items within the lower flight assembly, after two groups (810, 816 of FIGS. 8 through 10) of stacked product items were removed from the lower flight assembly by product pusher 818 and a robotic arm. Group 504 of stacked product items will continue to move downwardly, until it is in the location of group 816 in FIGS. 8 and 9.

FIG. 11 shows upper and lower flight operational zones, which are generally coextensive with movement and operation of the upper and lower flight assemblies, respectively. The upper flight assembly, operating in the upper flight operational zone, is responsible at least for down-stacking product items into groups, and transferring the grouped items to flights in the lower flight assembly. The lower flight assembly, operating in the lower flight operational zone, is responsible at least for receiving the transferred groups, and for positioning the received groups for pickup by end-of-arm tool(s) of robotic arm(s) (or for direct transfers to case(s), such as by using side-loading techniques).

Example Methods

Figure 12A:
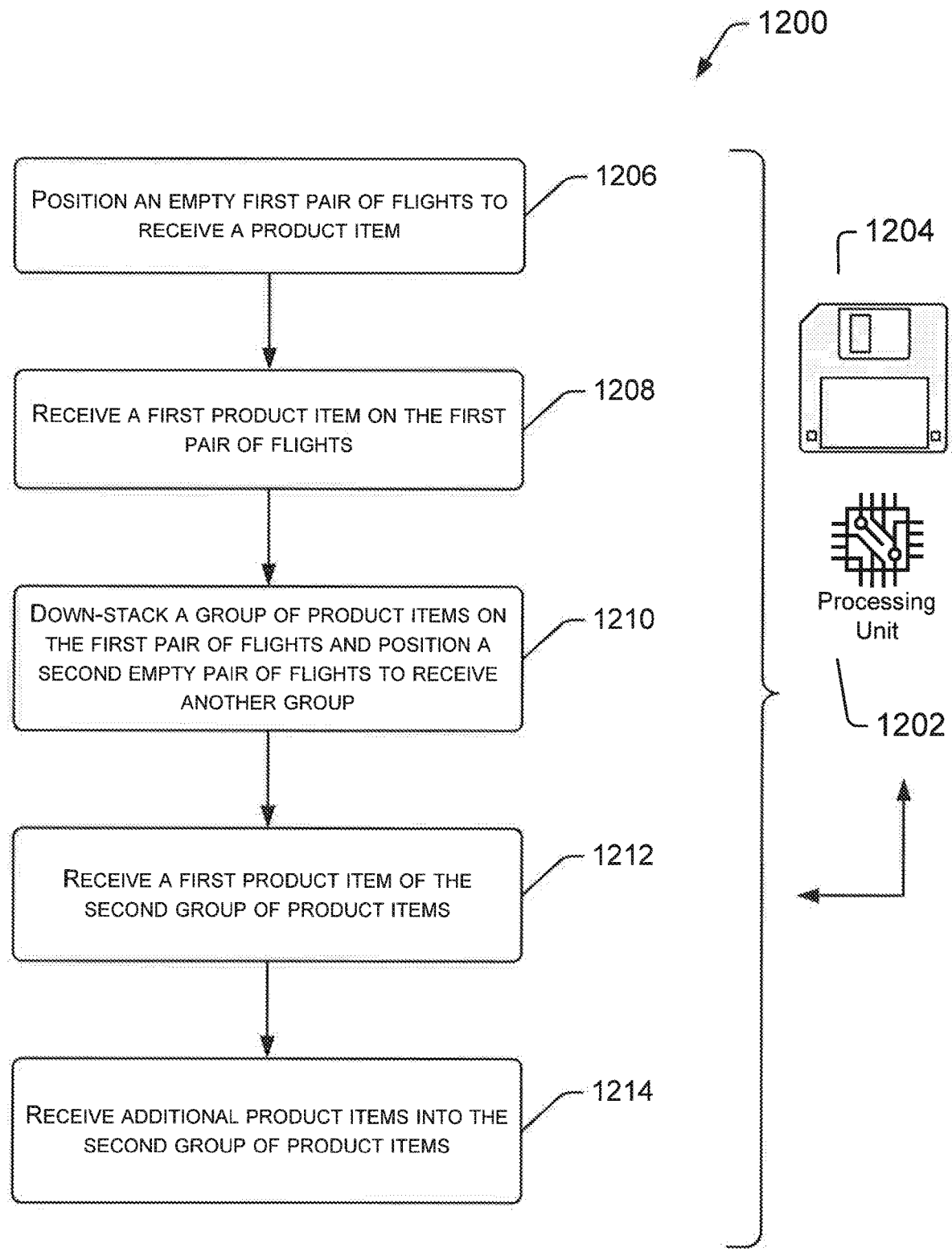
FIGS. 12A and 12B are a flowchart showing example operation of the product-stacking and case-packing system.
Figure 12B:
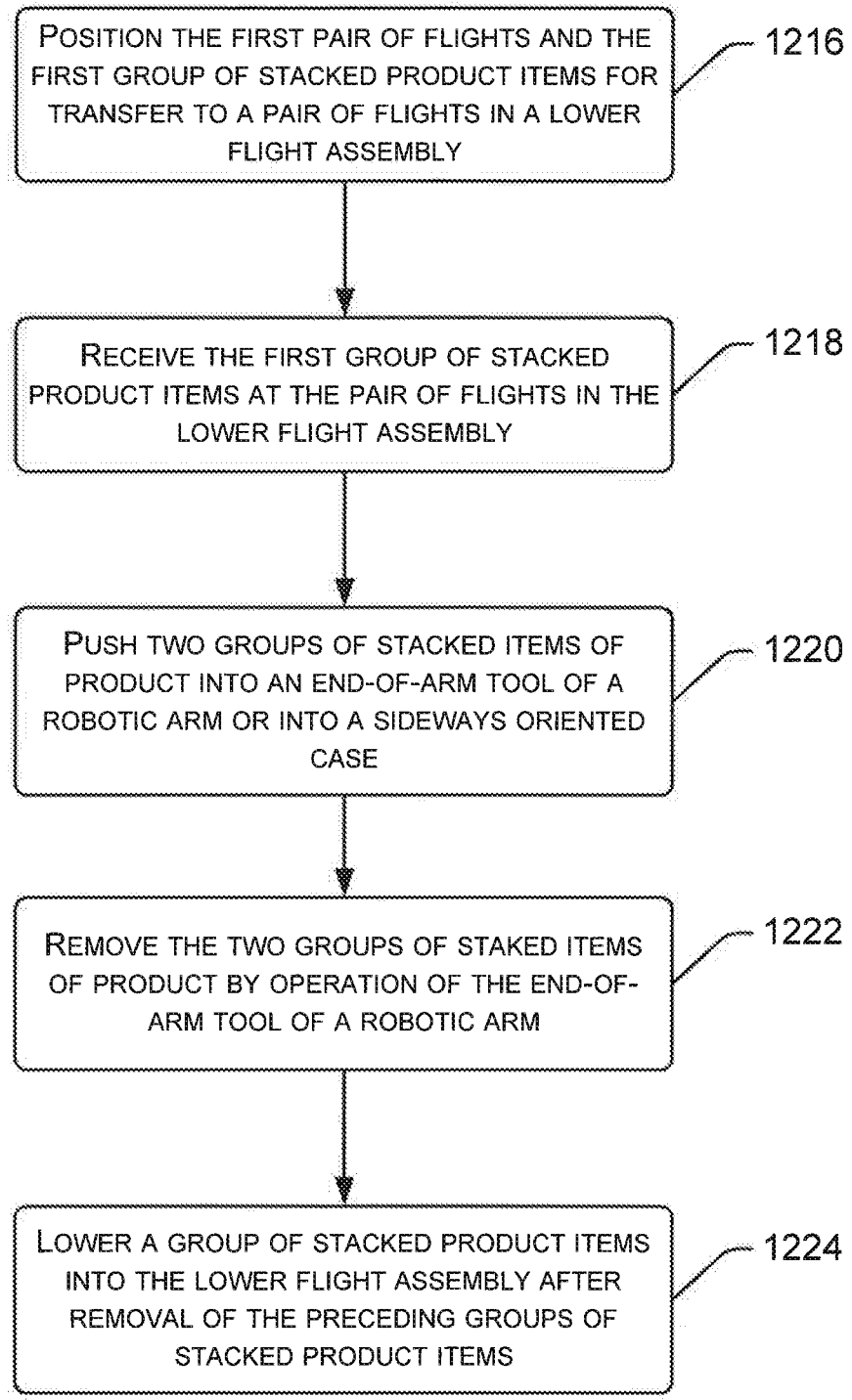

FIGS. 12A and 12B are flowcharts showing an example method 1200 operation of a product-stacking and case-packing system, method, techniques and/or device. The methods and operation may be performed and/or directed by any desired processor 1202, integrated circuit, logic devices, programming, etc. The example methods of FIGS. 12A and 12B may be implemented at least in part using the structures and techniques shown in FIGS. 1-11. However, the methods of FIG. 12 contain general applicability, and are not limited by other drawing figures and/or prior discussion. The functional blocks of FIG. 12 may be implemented by software and/or hardware structures or devices that are configured to operate a packaging system or device. In one example, one or more functional blocks may be implemented by aspects including a device controlled by a microprocessor 1202, a ladder logic device, a microcontroller or other logic device, etc., one or more memory devices 1204, computer-readable media, application specific integrated circuits, software blocks, subroutines, programs, etc. Computer-readable media, as the term is used herein, includes, at least, two types of computer-readable media, namely computer storage media and communications media. Computer storage media includes volatile and non-volatile, removable and non-removable media implemented in any method or technology for storage of information such as computer readable instructions, data structures, program modules, or other data.

Computer storage media and memory devices include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Computer storage media may be non-transitory in nature. In contrast, communication media may embody computer readable instructions, data structures, program modules, or other data in a modulated data signal, such as a carrier wave, or other transmission mechanism.

As defined herein, computer storage media does not include communications media or transitory signals.

At block 1206, a first pair of flights is positioned to receive one or more product items. In the example of FIG. 3, the flights 304, 306 constitute a pair of flights, and are in position to receive a first product item. The product item may be an envelope of powdered sauce mix, drink mix, pet food or treat, or any other product or object. Each of the flights 304, 306 is moved by a belt driven by a servo motor, and may be precisely and quickly positioned. The spacing between the flights 304, 306 is such that the edge portions of the product items are supported, on the left and the right, by respective flights of the pair.

At block 1208, a first product item is received on the first pair of flights. In the example of FIG. 4, the product item 108 is received and supported by the first pair of flights 304, 306. The product item 108 is received from the conveyor 106. Because the speed of travel of the product items is known, their trajectory as they fly off the end of the conveyor is known, and the first flight pair is properly positioned to receive the product item 108.

At block 1210, a first group of product items is down-stacked on the first pair of flights. Referring to the example of FIG. 5, the flights 304 (not seen) and 306 incrementally move downwardly to make room for each product item as it flies off the end of the conveyor and is stopped by the backstop 302. In some examples, the down-stacking motion may be stop-and-go, or smooth and continuous. At the point illustrated in FIG. 5, the first group 504 of product items supported by the first pair of flights 304, 306 is fully formed with the desired number of items. Accordingly, the first pair of flights 304, 306 will move down, as the flights prepare to hand off their load of product items to the lower flight assembly.

Also at block 1210, a second pair of flights is positioned to receive another group of product items. In an example, additional product items will be supported by a second pair of flights 312, 314 that have moved into position to begin receiving a second group of product items. By the time that the first item of the second group arrives, the second pair of flights 312, 314 will be in position to receive that item. Accordingly, the flight pair 304, 306 and the flight pair 312, 314 may move at the same time, and with speeds and timing that are appropriately programmed.

At block 1212, the first product item of the second group of product items is received by the second pair of flights. In the example of FIG. 6, the first product item 506 has landed on the flight pair 312 (obscured, in this view) and 314, and is skidding (or flying) toward the backstop 302. A further product item 602 will arrive shortly, and the flight pair 312, 314 will down-stack (move downwardly by an appropriate incremental distances) to make room for item 602 to land on top of item 506.

In an example illustrating the techniques of block 1212, the first flight pair are moved out of the stream of product items, and the second flight pair are moved into the stream of product items. Thus, in the example, the first flight pair are moved to prevent an item from the conveyor assembly from joining the first group of items, and the second flight pair are moved to allow the item from the conveyor assembly to join a second group of items.

At block 1214, additional product items are received into the second group of product items. In the example of FIG. 7, product item 702 is moving into position on the top of the stack, having been propelled off the end of the conveyor. Product items 704, 706 are following behind item 702, and will join the group 708 of stacked product items. The group 504 of stacked product items is moving downwardly in response to movement of flights 304, 306.

At block 1216, the first pair of flights (of the upper flight assembly) positions the first group of stacked product items for transfer to a pair of flights in a lower flight assembly. Referring to the example of FIG. 8, the flights 802, 804 of the lower flight assembly are in position to receive the group 504 of stacked product items when they are released by the flights 304, 306 of the upper flight assembly. As seen in the view of FIG. 8, the flights 304, 306 are beginning to pivot, as the part of the belt to which each flight is attached wraps around a roller or servo motor. The flight pair 304, 306 will move upwardly, and will soon be in the position of flights 312, 314 in FIG. 3.

At block 1218, the first group of stacked product items is received at a pair of flights in the lower flight assembly. Referring to the example of FIG. 9, the group 504 of stacked product items has been released by the flight pair 304, 306. The flights 304, 306 are rotating about the servo motors that drive the belts to which they are attached, and are moving toward a position at which they will down-stack another group of product items. The group 504 of stacked items has dropped onto the pair of flights 802, 804. The flights 802, 804 will move the group 504 into a position from which it will be accessible to the robotic arm.

In an example illustrating the techniques of block 1218, the first group of stacked product items is received at a pair of flights in the lower flight assembly by releasing the first group of items from the first flight to a third flight, wherein the third flight moves at least in part according to operation of a third servo motor, between a location wherein the first group of items was received, by the third flight from the first flight, and the lower flight operational zone.

In a further example illustrating the techniques of block 1218, the first group of items is moved into the lower flight operational zone by techniques including: releasing the first group of items from the first flight, to allow the first group of items to fall under power of gravity to a third flight; moving the first group of items, by operation of the third flight, to an area adjacent to a product pusher; and moving, by operation of the product pusher, the first group of items into the end-of-arm tool of the robotic arm. According to examples of moving the first group of items into the lower flight operational zone, the down-stacking motion of the first flight and motion of the third flight are in a vertically-stacked relationship.

At block 1220, two groups of stacked product items are pushed into a position at which they are loaded into the end-of-arm tool, or loaded directly into a case. Referring to the example of FIG. 10, the pusher 818 has pushed two groups 810, 816 of stacked product items out of the lower flight operational zone of the product stacker. Note that while two groups 810, 816 are shown, a greater or lesser number of groups could be pushed from the lower flight operational zone by the pusher 818. Also, while the pusher 818 has pushed the two groups of stacked items into either the end-of-arm tool or into a case with the open end oriented horizontally, the tool and the case are not shown, to allow view of the two groups of stacked product items.

At block 1222, the two groups of stacked product items are removed by operation of the robotic arm and end-of-arm tool. Referring to the example of FIG. 1, the robotic arm 114 and end-of-arm tool 116 are shown. With the two groups pushed by the pusher bar into the end-of-arm tool, as seen in FIG. 10 (with the end-of-arm tool seen in FIG. 1), the end of arm tool is able to grasp the groups, such as by operation of the grippers 118, 120, associated flaps, and actuators. The end-of-arm tool may then deposit the groups of product items into one or more cases on a conveyor (e.g., cases 126, 128 of FIG. 1).

At block 1224, a group of stacked product items is lowered into the lower flight assembly. After removal of the groups of stacked product items in block 1222, there is room for additional groups to replace them in the lower flight assembly. Referring to the example of FIG. 11 the group 504 of stacked product items is moved into a position adjacent to the pusher 818. The group 504 may be moved lower, and a second group added, before the pusher 818 moves both groups in a manner seen in FIG. 10.

Figure 13:
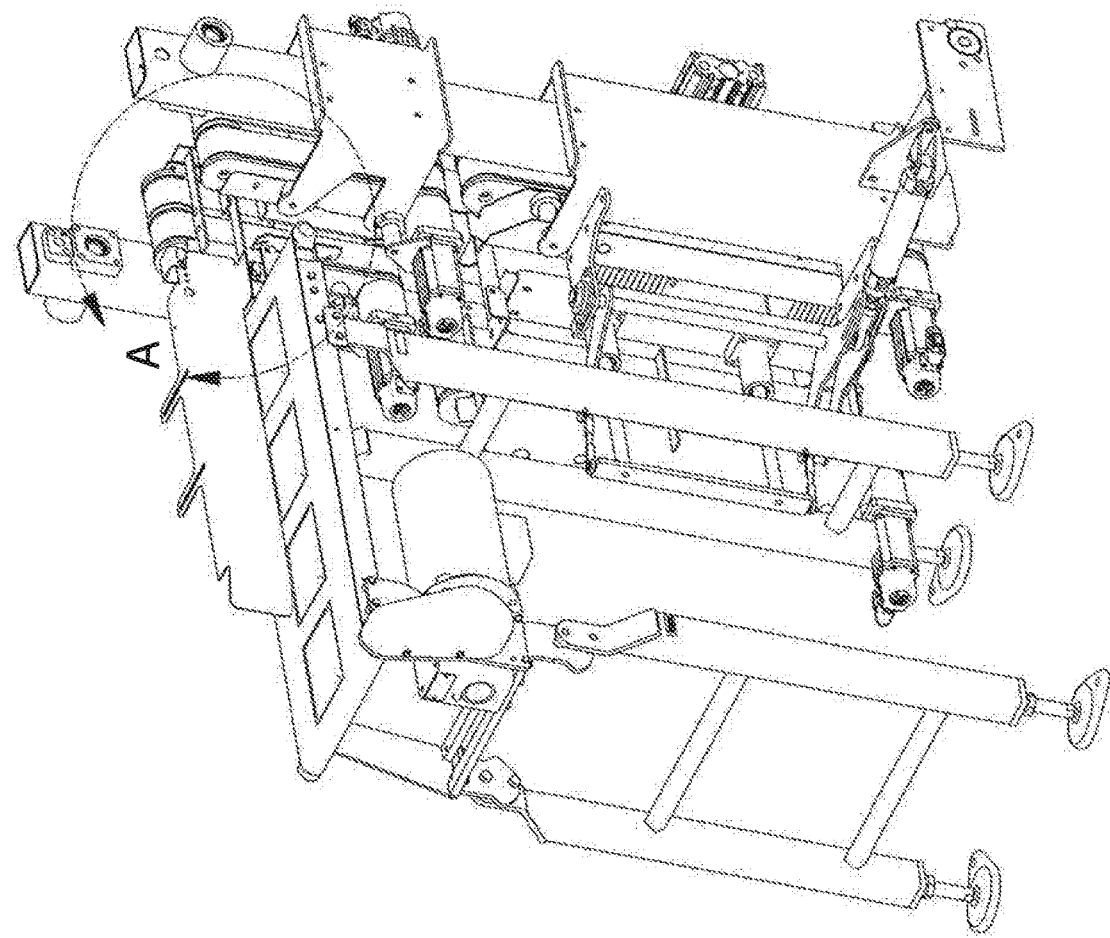
FIG. 13 shows the example product-stacking assembly from which the detailed views of FIGS. 3-7 were taken.

FIG. 13 shows an example product-stacking assembly from which the detailed views (Detail "A") of FIGS. 3-7 were taken.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
moving a first flight using a down-stacking motion to receive a first group of items, wherein items are incoming on a conveyor assembly;
moving a second flight in a down-stacking motion to receive a second group of items;
moving the first group of items into a lower flight operational zone, wherein the lower flight operational zone includes a third flight and a fourth flight, and wherein the first group of items is moved by releasing the first group of items from the first flight, to drop the first group of items under power of gravity from the first flight to the third flight, and wherein simultaneously:
the first group of items on the third flight is within the lower flight operational zone;
the second group of items is being received by the down-stacking motion, wherein the second group of items is vertically in-line above the first group of items; and
a third group of items and a fourth group of items are in positions to be moved by a robotic arm and an end-of-arm tool, and wherein the third and fourth groups of items are vertically in-line below the first and second groups of items; and
moving both the third group of items and the fourth group of items from the lower flight operational zone and into at least one case, by operation of the robotic arm and the end-of-arm tool, wherein moving the third group of items and the fourth group of items into the at least one case makes room for the first group of items and the second group of items to be moved into the lower flight operational zone.

2. The method of claim 1, wherein:
the first flight comprises a pair of flights, and
moving the first flight using the down-stacking motion comprises moving the pair of flights by operation of a pair of servo motors.

3. The method of claim 1, wherein moving the first group of items into the lower flight operational zone comprises:
releasing the first group of items from the first flight to the third flight, wherein the third flight moves at least in part according to operation of a third servo motor, between a location wherein the first group of items was received, by the third flight from the first flight, and the lower flight operational zone.

4. The method of claim 1, wherein moving the first group of items into the lower flight operational zone comprises:
moving the first group of items, by operation of the third flight, to an area adjacent to a product pusher; and
moving, by operation of the product pusher, the first group of items into the end-of-arm tool of the robotic arm.

5. The method of claim 1, wherein moving the first group of items into the lower flight operational zone comprises:
releasing the first group of items from the first flight to the third flight, wherein the down-stacking motion of the first flight and motion of the third flight are in a vertically-stacked relationship.

6. The method of claim 1, wherein moving the first flight and moving the second flight comprises:
moving the first flight to prevent an item from the conveyor assembly from joining the first group of items; and
moving the second flight to allow the item from the conveyor assembly to join the second group of items.

7. The method of claim 1, additionally comprising:
transferring the first group of items from the first flight to the third flight;
moving the first group of items according to movement of the third flight; and
pushing, by operation of a product push bar, the first group of items from the lower flight operational zone into the end-of-arm tool of the robotic arm.

8. A product-stacking system, comprising:
an upper flight assembly, comprising:
a backstop, to stop incoming items;
a first pair of flights;
a second pair of flights, wherein the first pair of flights and the second pair of flights are configured to alternate between down-stacking the incoming items and providing groups of down-stacked items to a lower flight assembly; and
the lower flight assembly, comprising:
a third pair of flights;
a fourth pair of flights; and
a fifth pair of flights, wherein the first pair of flights, the second pair of flights, the third pair of flights, the fourth pair of flights, and the fifth pair of flights are configured, simultaneously and respectively, to down-stack a first group of items, to drop a second group of items to fall under power of gravity from the upper flight assembly, to receive the second group of items dropped from the upper flight assembly, to locate a third group of items in an upper location for pick-up by a robotic arm, and to locate a fourth group of items in a lower location for pick-up by the robotic arm;
a pusher to push one or more groups of items; and an end-of-arm tool attached to the robotic arm, wherein the end-of-arm tool is configured to grasp one or more groups of items moved by the pusher.

9. The product-stacking system of claim 8, additionally comprising:

a servo motor to drive a belt assembly of the first pair of flights, wherein operation of the servo motor is configured to drop the second group of items from the upper flight assembly to the lower flight assembly.

10. The product-stacking system of claim 8, additionally comprising:

a servo motor to drive a belt assembly driving the first pair of flights to a position previously occupied by the second pair of flights when the second pair of flights has received a full group of items.

11. The product-stacking system of claim 8, additionally comprising:

servo motors to drive a belt assembly driving the fourth pair of flights from a position at which the fourth pair of flights may receive the second group of items from the upper flight assembly and to a position at which the pusher may act on the second group of items.

12. The product-stacking system of claim 8, wherein the upper flight assembly comprises two pair of flights, and two respective servo motors and the lower flight assembly comprises three pair of flights, and three respective servo motors.

13. The product-stacking system of claim 8, wherein the lower flight assembly is configured with sufficient pairs of flights to allow one pair of flights to be waiting to receive a group of items from the upper flight assembly and two pairs of flights holding groups of items waiting for the pusher to act.

* * * * *